Dec. 15, 1942.   E. A. WILCKENS   2,304,982
ARTICLE HANDLING APPARATUS
Filed June 8, 1938   8 Sheets-Sheet 1
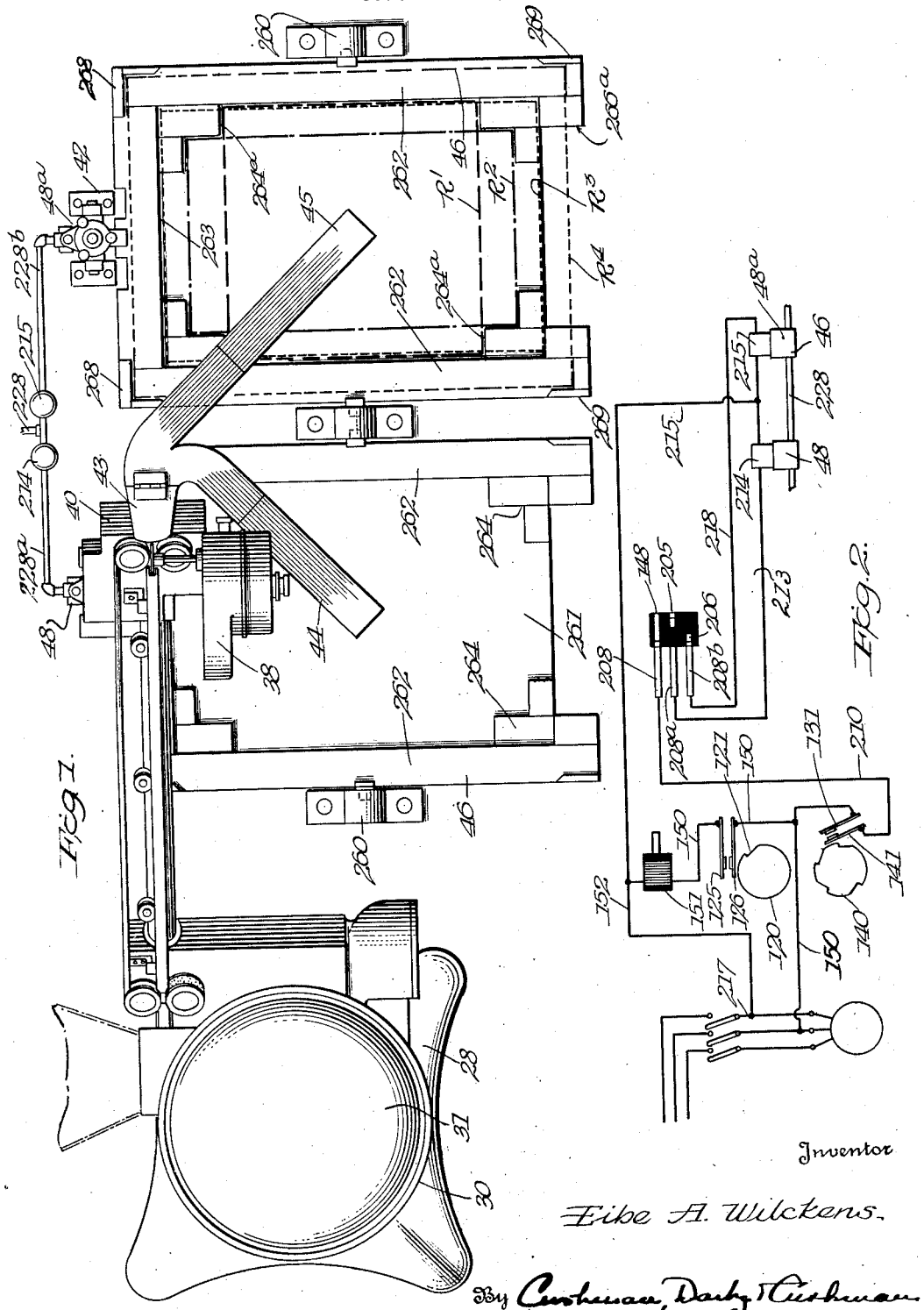
Inventor
Eibe A. Wilckens.
By Cushman, Darby & Cushman
Attorneys Dec. 15, 1942.  E. A. WILCKENS  2,304,982
ARTICLE HANDLING APPARATUS
Filed June 8, 1938  8 Sheets-Sheet 2
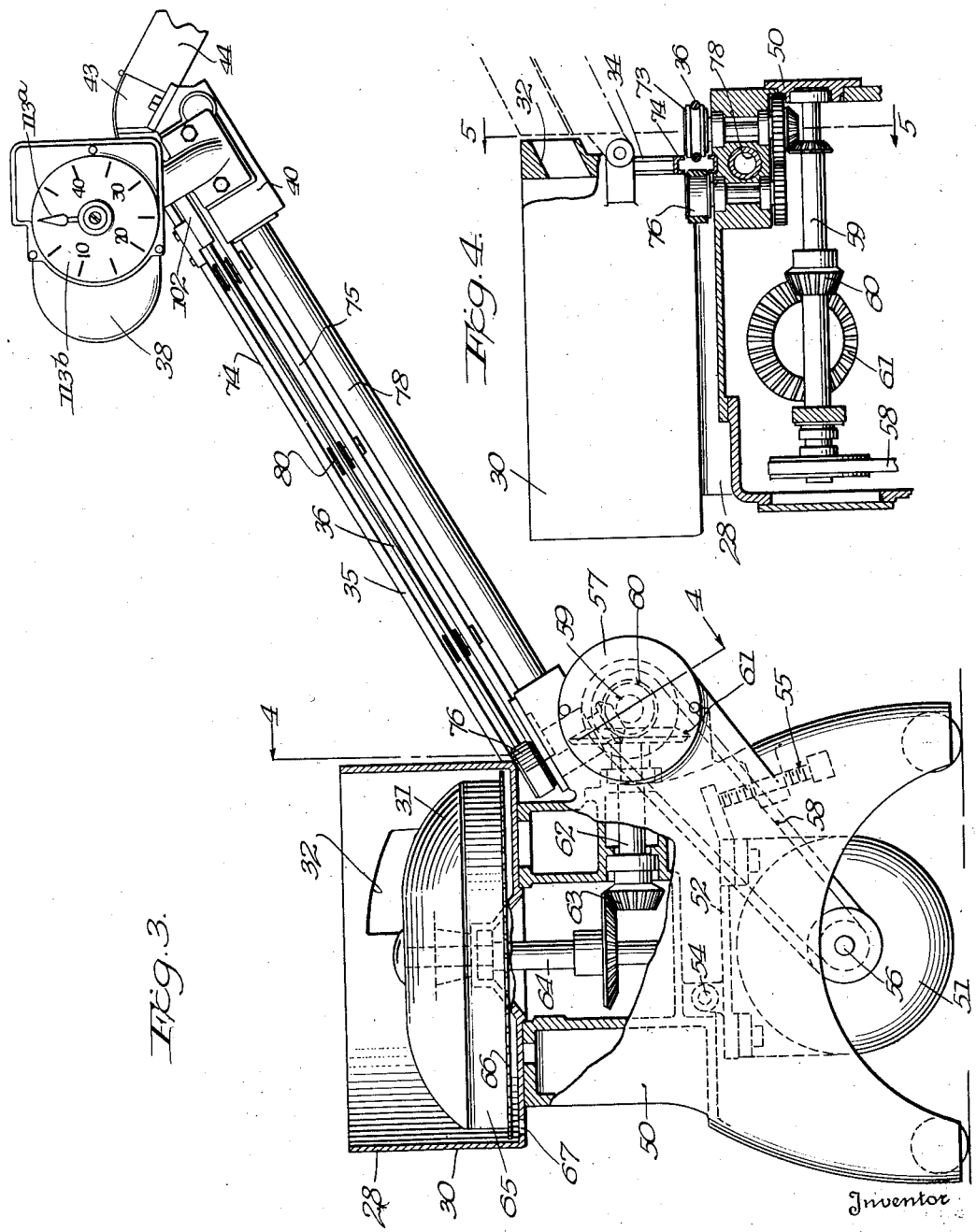

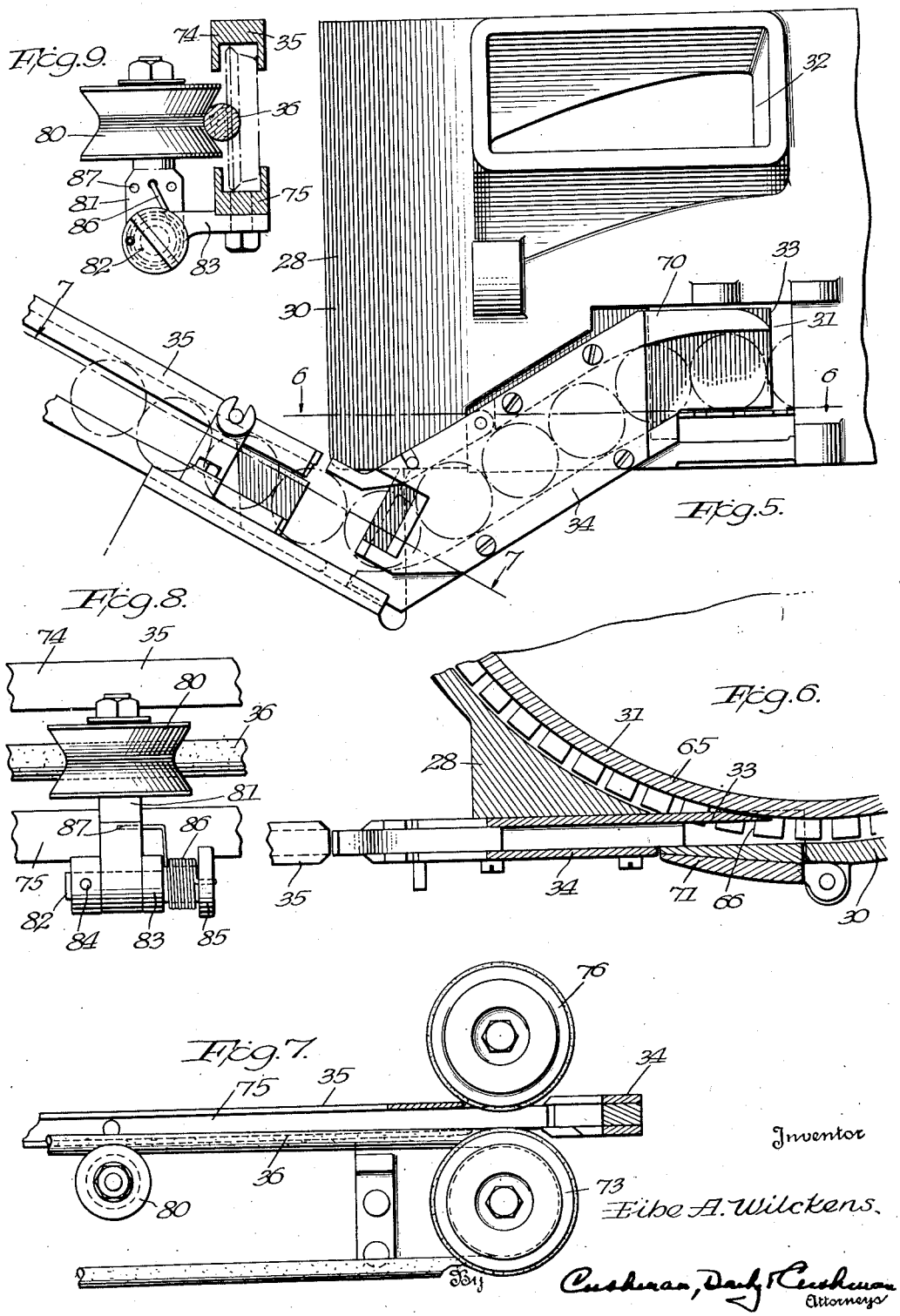

Dec. 15, 1942.  E. A. WILCKENS  2,304,982
ARTICLE HANDLING APPARATUS
Filed June 8, 1938  8 Sheets-Sheet 4

Inventor
Eibe A. Wilckens
By Cushman, Darby & Cushman
Attorneys

Dec. 15, 1942.                    E. A. WILCKENS                    2,304,982
                              ARTICLE HANDLING APPARATUS
                          Filed June 8, 1938           8 Sheets-Sheet 5
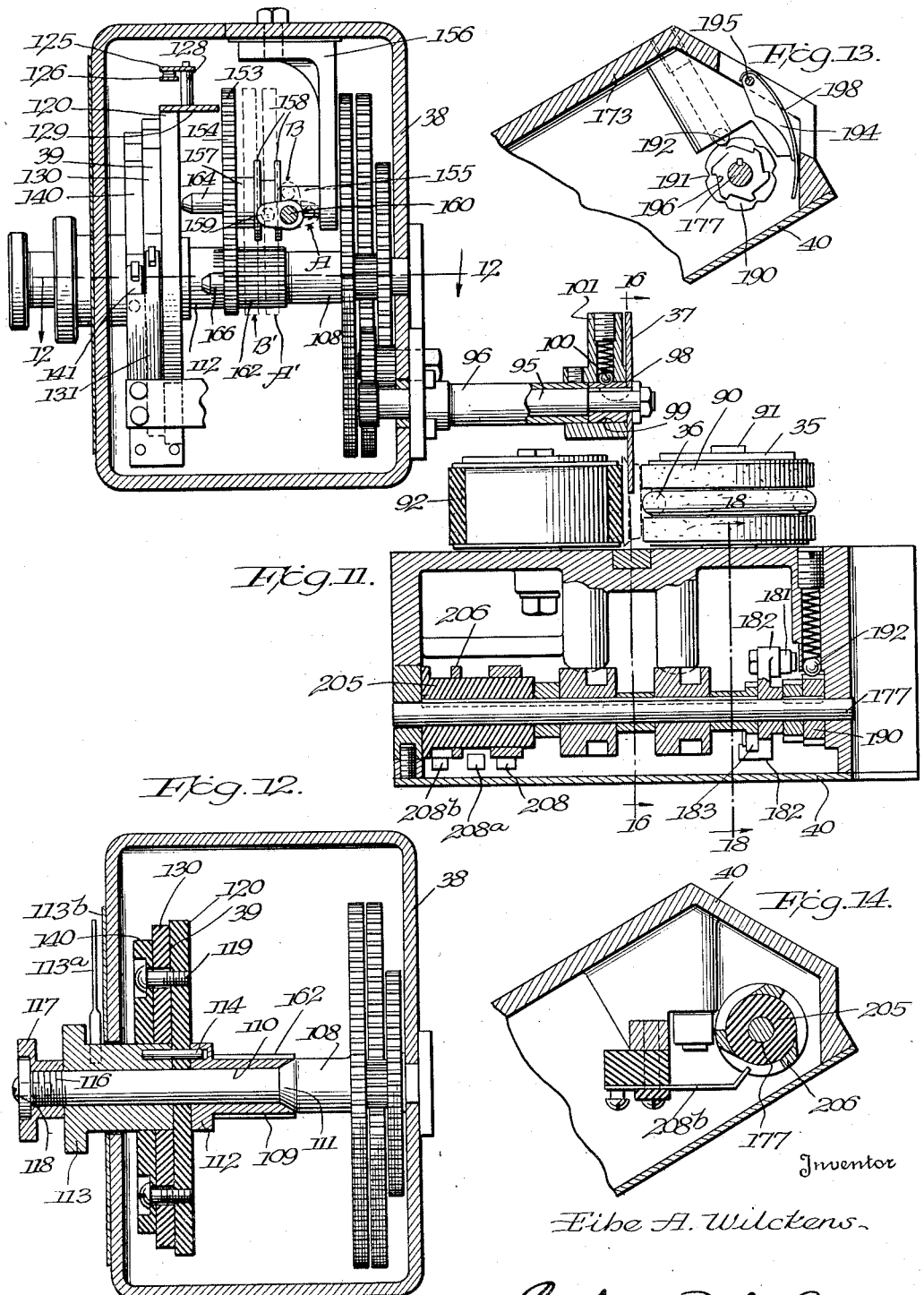
Inventor
Eibe A. Wilckens
By Cushman, Darby & Cushman
Attorneys

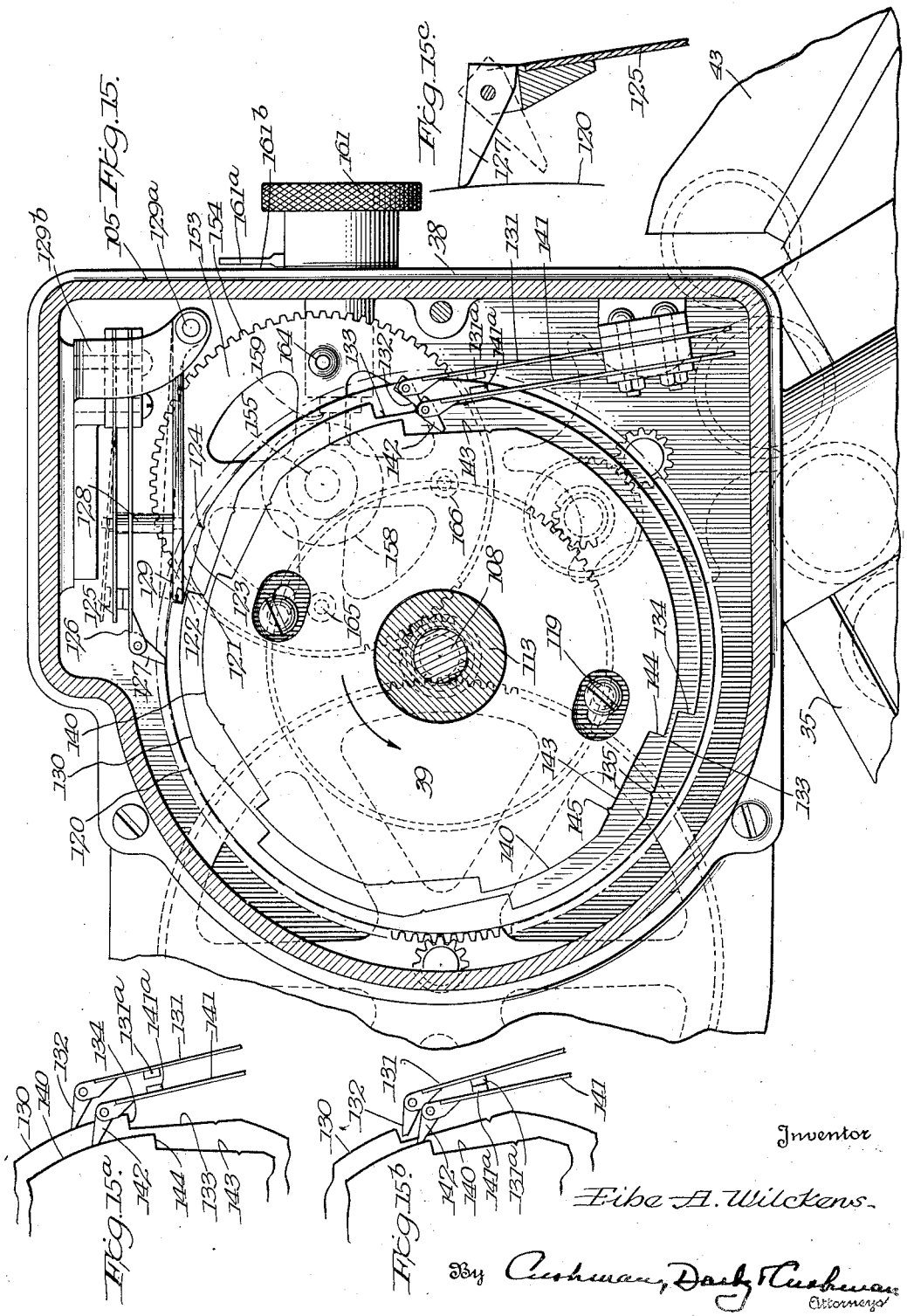

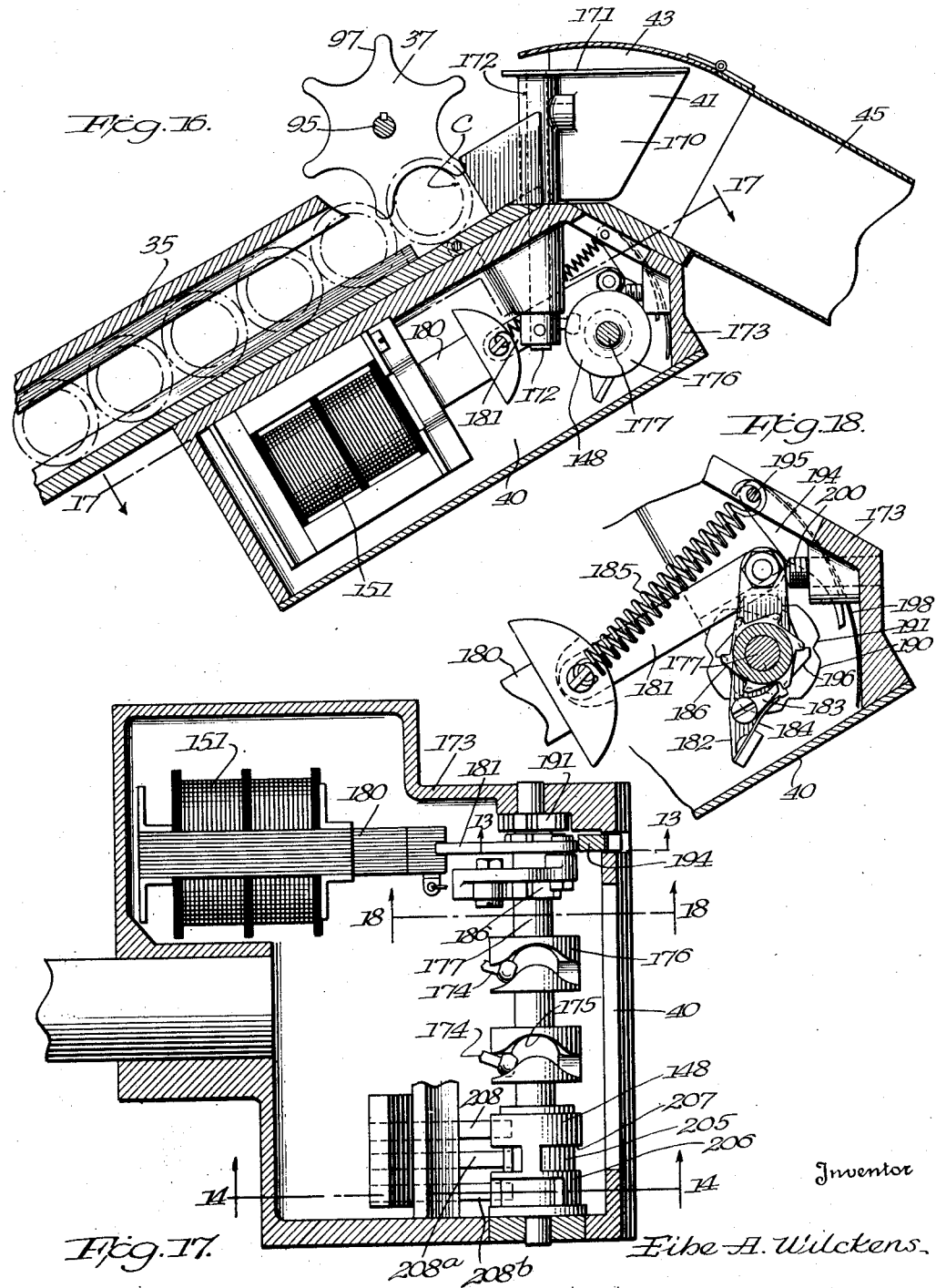

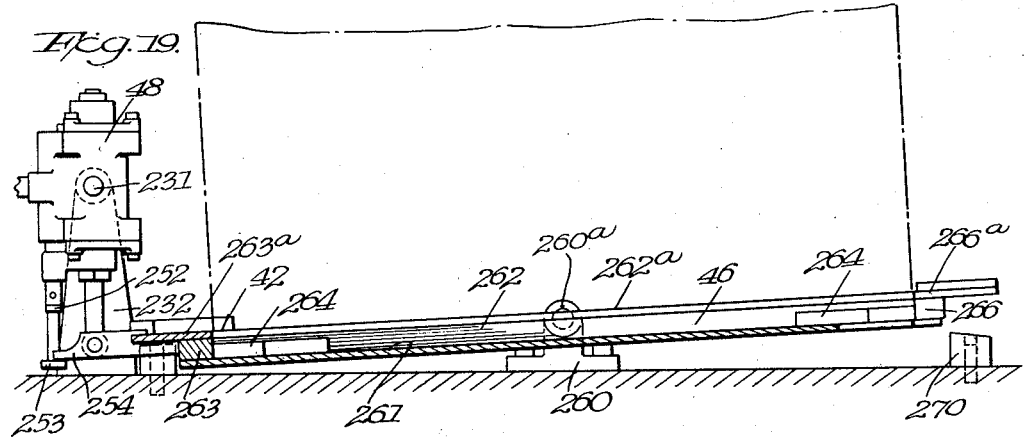
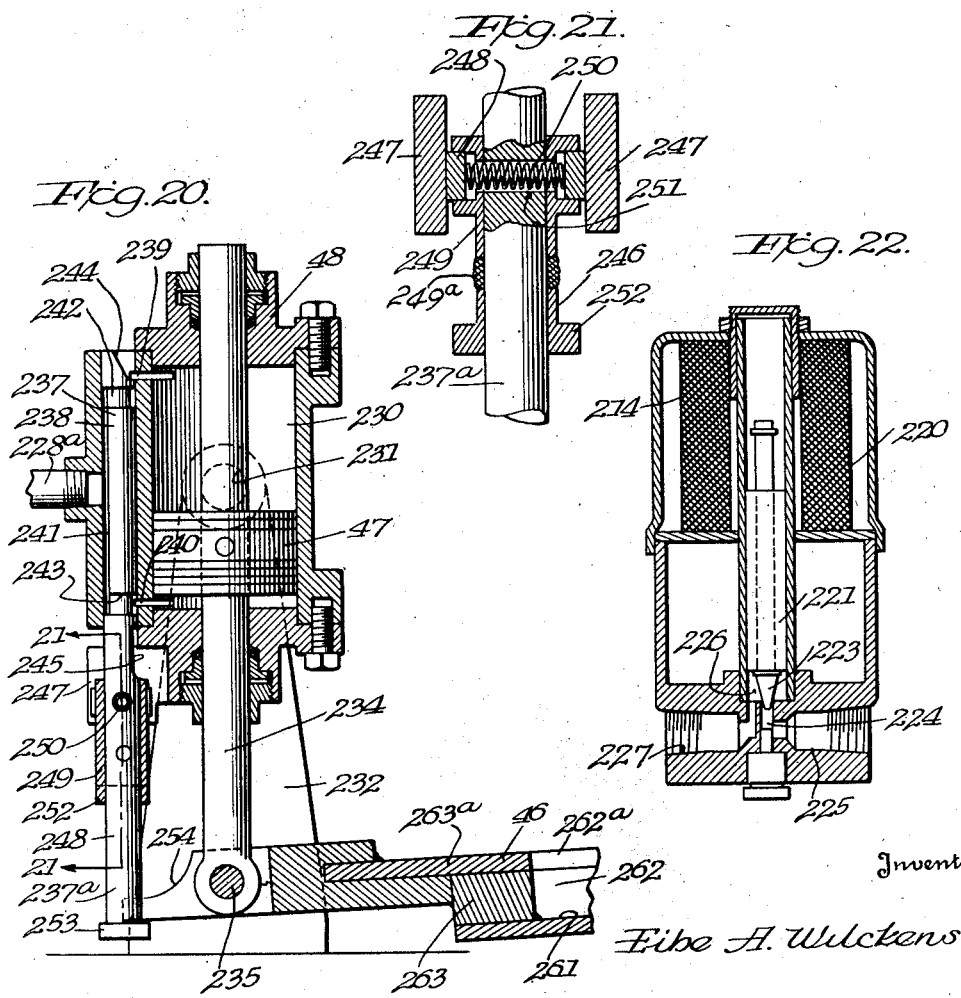

Patented Dec. 15, 1942

2,304,982

UNITED STATES PATENT OFFICE 2,304,982

ARTICLE HANDLING APPARATUS

Elbe A. Wilckens, Baltimore, Md., assignor to Crown Cork & Seal Company, Inc., Baltimore, Md., a corporation of New York Application June 8, 1938, Serial No. 212,573

9 Claims. (Cl. 235—98)

The present invention relates to an article handling apparatus and, more particularly, to an article handling apparatus including mechanisms to direct a counted number of articles to a shipping receptacle, the apparatus also including a mechanism to insure that a loose mass of articles is properly settled within the shipping receptacle.

In the manufacture of numerous types of articles, it is desirable that a predetermined number of articles be packed in each shipping receptacle, and also that the articles be counted automatically as they move to the receptacle. In the packing of a number of small, light articles, it is likewise desirable that the articles be firmly settled in the receptacles so that the latter need be no larger than its rated capacity, thereby avoiding having articles in a loose condition in the receptacle and also reducing unnecessary cost in receptacles.

The principal object of the present invention is to provide an apparatus which will fulfill the above requirements; that is, will automatically direct the proper number of articles to a shipping or packing receptacle, the apparatus also being so constructed that articles may be firmly settled in the receptacles.

While the invention is applicable to the handling of numerous types of articles, in the embodiment shown in the accompanying drawings, the apparatus is illustrated as handling container caps of the crown type and, for convenience, in the description of the apparatus, the articles handled are referred to as caps.

Referring specifically to the use of the present apparatus and its various mechanisms for handling caps, machines of the same general type have previously been provided but have not been entirely satisfactory. For example, in the earlier machines, the caps were delivered to the counting mechanism without being adequately held just prior to and during the counting operation. As a result, caps were badly marred by being struck by impelling devices and the counting operation was not highly accurate, the latter difficulty being primarily due to the fact that the caps were sufficiently free to move past the counting member without entirely actuating the latter. Another deficiency of the prior machines was their slow response to the counting mechanism. That is to say, when a given count had been made and the machine therefore should have diverted the flow of caps from the filled shipping receptacle to a second and empty receptacle, there was a marked time lag between the completion of the count and the termination of flow to the full receptacle. Since caps are not necessarily delivered to a counting mechanism in a constant stream, this time lag could not be accepted as a fixed factor, and thus there was no way of insuring that a shipping receptacle contained the proper quantity.

Another important object of the invention is to provide an apparatus of the type described wherein the mechanism for diverting the flow of caps or other articles is prompt in action and is so arranged that it will place the proper number of caps in each receptacle.

Another object of the invention is to provide a counting mechanism and feeding means associated therewith which will firmly hold or grip the articles while the latter are moving through the counting mechanism, thereby insuring that each article will be counted. The invention also includes means to firmly hold the articles while moving them to the counting mechanism, thereby preventing articles, such as caps, from becoming marred by the conveying means.

Another object of the invention is to provide a mechanism for periodically shaking or vibrating shipping receptacles so that articles being placed therein will be firmly settled.

Still another object of the invention is to provide a mechanism for positioning a mass of articles in single line formation and with each article in the desired bodily position for movement through a counting means or other means which is to perform an operation upon the articles.

Machines have heretofore been constructed and used for the above purpose, such machines including a hopper or casing and a rotary drum. When a mass of articles was delivered to the rotary drum, the articles would be moved by centrifugal force to the outer edge of the drum and thence moved, by frictional contact with the surface of the drum, to an outlet through which they moved in single line formation and with the articles lying horizontal. The present mechanism is an improvement over mechanisms of the prior type in that the movement of the articles to the outlet is positively controlled. Also, the articles are turned to be positioned in a vertical plane, thereby facilitating their counting.

A still further object of the invention is to provide a novel counting means which can be readily set to count different quantities of articles, this mechanism also being extremely simple in construction.

Other objects and advantages of the invention will be apparent from the following specification and drawings.

In the drawings:

Figure 1 is a plan view of the apparatus of the present invention;

Figure 2 is a view diagrammatically showing the electrical circuits included in the apparatus;

Figure 3 is a side elevation partly in vertical section, of the apparatus;

Figure 4 is a vertical sectional view of the article positioning mechanism used with the apparatus, the view being on the angled line 4—4 of Figure 3;

Figure 5 is a vertical sectional view on the line 5—5 of Figure 4;

Figure 6 is a horizontal sectional view on the line 6—6 of Figure 5;

Figure 7 is a horizontal sectional view on the line 7—7 of Figure 5;

Figure 8 is a side elevation showing the mounting of a tensioning roll provided on the conveyor included in the apparatus;

Figure 9 is a view in side elevation of the tensioning roll of Figure 8, the view being at right angles to that of Figure 8 and showing the conveyor chute in transverse section;

Figure 11 is a view of the registering and delivery control mechanisms, the view being partly in elevation, and partly in vertical section;

Figure 12 is a horizontal sectional view on the line 12—12 of Figure 11;

Figure 13 is a detail view in vertical section on the line 13—13 of Figure 17;

Figure 14 is a detail vertical sectional view on the line 14—14 of Figure 17;

Figure 15 is a transverse vertical sectional view on the line 15—15 of Figure 10;

Figs. 15a, 15b and 15c are detail views showing various positions of contact members associated with the registering mechanism;

Figure 16 is a vertical sectional view on the line 16—16 of Figure 11;

Figure 17 is a horizontal sectional view through the delivery control mechanism, the view being on the line 17—17 of Figure 16;

Figure 18 is a transverse vertical sectional view on the line 18—18 of Figure 17;

Figure 19 is a side elevation of the shaking mechanism, showing one platform in vertical section;

Figure 20 is a central vertical sectional view of the actuating cylinder included in the shaking mechanism;

Figure 21 is a detail view of the device illustrated in Figure 20, the view being on the line 21—21 of Figure 20; and Figure 22 is a vertical sectional view through a selector valve used with the shaking mechanism.

Figure 10:
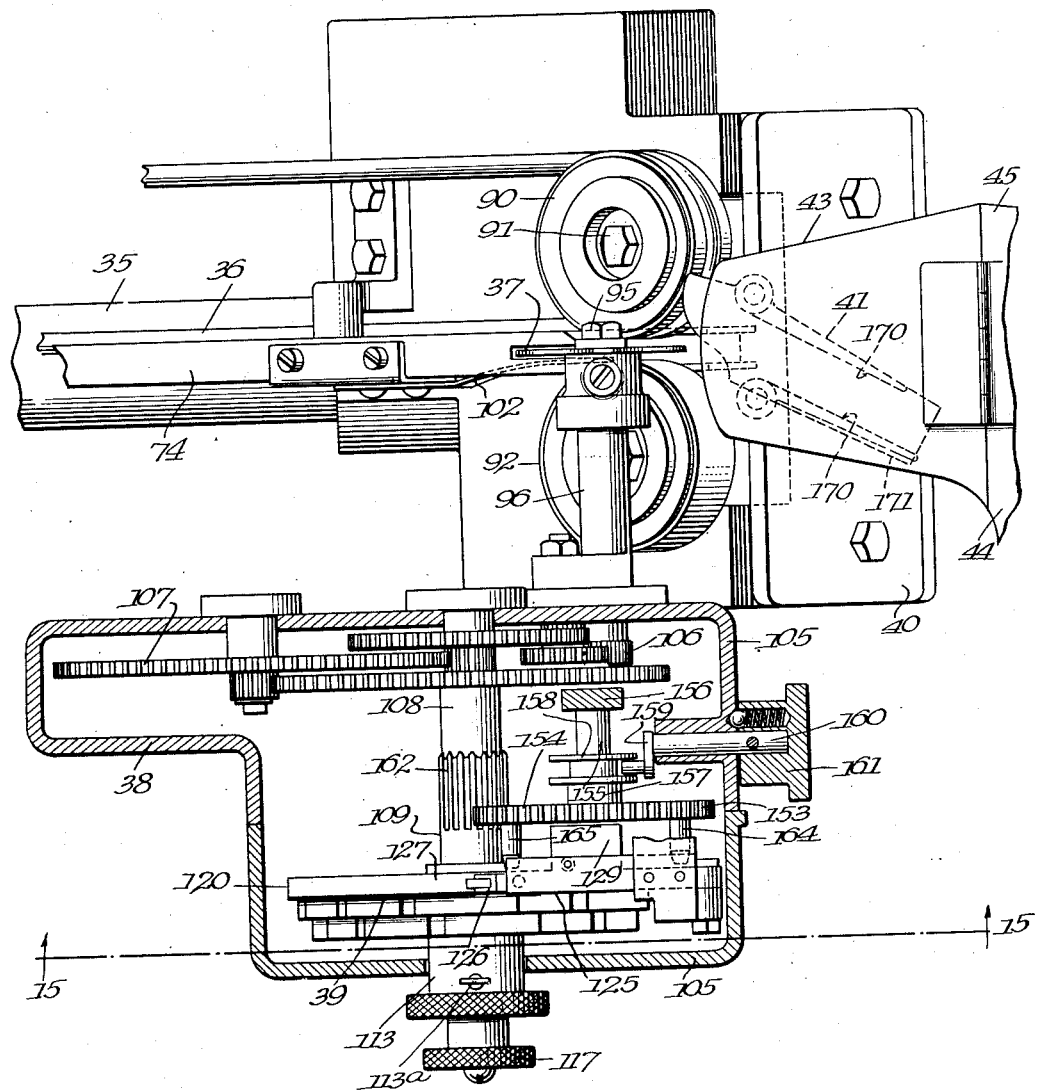
Figure 10 is a view showing the upper end of the conveyor of the invention in plan, and showing the registering and delivery control mechanisms in horizontal section.

The construction and operation of the present apparatus may be generally described as follows:

Referring to Figures 1 and 3, the numeral 28 designates a mechanism adapted to position a mass of caps or other articles in a line, and also to position each cap in a predetermined plane, the mechanism comprising a stationary hopper 30 having a rotary drum 31 mounted therein. Caps to be counted and packed by the apparatus of the invention are delivered to the hopper 30 through a chute 32 to fall upon the rapidly rotating drum 31. The rotation of drum 31 will cause the caps to move off the drum and into the space between the inner surface of the wall of hopper 30 and the periphery of drum 31 where they will stand on edge in a vertical plane and will move around with the rotating drum. A positive impelling action will be given the caps, because of the fact that the upper corner edges of horizontally extending lugs on the lower edge of the drum will engage the ribbed periphery of the caps. As best shown in Figures 5 and 6, articles moving about in the hopper 30 in the above-described position will be stripped from the drum 31 by a blade member 33, the impetus given the caps by the rapid rotation of drum 31 causing them to move along the blade member and into a chute 34. The outer end of chute 34 joins the lower end of a conveyor 35 along which moves one run of an endless belt or band 36. Caps entering the conveyor 35 from the chute 34 will be engaged by the belt 36 as best shown in Figure 9 and will be moved up the conveyor 35 at relatively high speed. As indicated in Figures 11 and 16, the upper end of conveyor 35 terminates adjacent a counting or article contacting wheel 37 and caps or other articles moving up the conveyor 35 will be moved into engagement with and beneath this wheel. The periphery of wheel 37 is provided with a plurality of pockets of such conformation as to engage the periphery of a cap or other article moving beneath the same, and since the articles are still positively engaged by the moving element of conveyor 35, wheel 37 will be rotated to thereby drive the counting mechanism 38 of which it forms a part.

The counting mechanism 38 is provided with a group of cam discs comprising a cam structure 39 which control electrical circuits connected to a selector mechanism generally indicated by the numeral 40 (Figures 1, 10 and 16) and including a pivoted article guiding plate or element 41. The cam structure 39 also controls electrical circuits connected to packing receptacle shaking mechanisms 42 (Figures 1 and 19). The cam structure 39, by its rotation resulting from connection with the counting wheel 37, will, when a predetermined number of caps have moved beneath the wheel 37, cause the selector mechanism 40 to be actuated to change the position of the guide plate 41. As best shown in Figure 10, guide plate 41 is pivotally mounted in a chute 43 opening to two delivery spouts 44 and 45 respectively, and the position of the guide plate in the chute controls the movement of caps to one spout or the other. In use, a shipping receptacle for the caps or other articles being handled will be positioned beneath each of the spouts and the counting mechanism 38 will cause a proper number of caps to move through one of the spouts and into the receptacle beneath the same and will then swing the guide plate 41 to cause succeeding caps to be moved through the other spout and into the receptacle beneath the same. The packing receptacles are supported upon pivotally mounted platforms generally indicated by the numeral 46, and the cam discs 39 of the registering mechanism 38 may be set to control an electrical circuit and thereby cause these platforms to be shaken at predetermined intervals during the feed of caps thereto so that the caps will be settled in the box being filled. The oscillation or shaking of a platform 46 is effected by a pneumatically actuated piston 47 reciprocably mounted in a cylinder 48 associated with that platform, the selector mechanism 40 including means to cause shaking of only one platform 46, namely, the platform which carries the packing receptacle to which caps are at that moment being delivered.

The article positioning means

As best shown in Figure 3, the article positioning means has the hopper 30 thereof fixed to a support or base frame 50 in which is mounted a motor 51, motor 51 being secured to a base plate 52 having one end pivoted to the support 50 as indicated at 54. The other end of the base plate 52 bears upon a large set screw 55 threaded in the support 50. By adjustment of the set secrew 55, the position of the motor and its shaft 56 with respect to the support 50 and also with respect to a pulley 57 driven from the motor 51 by a belt 58 can be adjusted and, in this way, the tension of the belt 58 can be controlled.

As best shown in Figures 3 and 4, shaft 59 is journaled to extend horizontally of the support 50 and has a bevel gear 60 fixed thereto which meshes with a bevel gear 61 fixed to one end of a horizontal shaft 62 also journaled in the support 50, the inner end of shaft 62 driving, through suitable bevel gearing 63, an upright shaft 64 having its upper end extending into the hopper 30. The rotary drum 31 is carried by the upper end of the shaft 64, drum 31 including a depending skirt portion 65 extending substantially parallel to the inner wall of the hopper 30, but separated from the inner wall by a distance sufficient to permit the articles to be handled to fall into the space thus provided. In the use of the machine with container caps of the crown type, the skirt 65 would be spaced from the inner wall of the hopper 30 a distance substantially corresponding to the thickness of a cap, as indicated in Figure 6. The lower edge of the skirt is also provided with outwardly projecting lugs or teeth 66 to support the caps, the teeth being spaced sufficiently to permit dirt or foreign matter to fall out of the machine through apertures 67 in the lower wall of the hopper 30 and illustrated in Figure 3.

The rotation of the drum 31 at relatively high speed will cause the top corner edges of the teeth 66 to contact with the ribs on the cap skirts to drive the caps about with the drum 31. The contact of the caps with the skirt of the drum will also serve to move the caps with the drum. When the caps standing upon the supporting lugs or teeth 66 come opposite the inner end of the chute 34, the caps will be stripped from the drum by the blade member 33 (Figure 6), which has its inner edge closely adjacent the periphery of the drum. Since the caps are moving at high speed, they will slide outwardly and downwardly in the chute 34 as indicated in Figure 5. A top guide finger 70 illustrated in Figure 5 forms the upper wall of the chute 34 and projects sufficiently into the hopper 30 to guide caps into the chute. A closure 71 (Figure 6) is pivotally supported upon the hopper 30 opposite the stripper blade member 33 and the finger 70 to permit access to these elements in the event that the caps should become jammed adjacent the same.

As best shown in Figure 5, the lower and outer end of the chute 34 communicates with the lower end of the conveyor 35, and a pair of rolls (Figure 7) is positioned at the lower end of the conveyor 35, or between the adjacent ends of the two chutes, one of the rolls, designated by the numeral 73, being grooved to receive the endless band 36 which extends upwardly along one side of and forms part of the conveyor 35. That is, the inner run of the belt 36 moves between the upper and lower guideways 74 and 75, respectively of the conveyor. A second roller indicated by the numeral 76 and having a resilient circumferential surface is positioned opposite the roller 73 to assist in guiding the caps from the chute 34 to the guideways of the conveyor 35. As illustrated in Figure 4, the rolls 73 and 76 are geared together and driven from shaft 59.

As best shown in Figure 3, the conveyor 35 is supported on an arm 78 extending upwardly and outwardly from the article positioning mechanism 30 and the upper and lower guideways 74 and 75 of the conveyor are suitably spaced by brackets adjacent each end thereof. The guideways 74 and 75 are U-shaped in cross section as best shown in Figure 9 so that the caps will have their upper and lower edges within the opposed troughs thus provided. In order to hold the inner run of the belt 36 in contact with the caps throughout the length of the run, idler tension rolls 80 are spaced along the conveyor 35, each roll 80 being mounted on a vertical stud 81 (Figures 8 and 9) having its lower end journalled on a pin 82 extending through apertures in a bifurcated bracket 83. One end of the pin 82 is held against rotation in the bracket by means of a cotter key or the like indicated at 84, the other end of the pin 82 being headed as shown at 85. A coil spring 86 surrounds the pin 82, one end of the spring being offset to extend into one of a number of sockets 87, and the other end of the spring being offset to extend through an aperture in the head 85 of pin 82. The tensioning of the idler rolls 80 will be obvious from the above described construction. It is found desirable to have the rolls 80 under sufficient tension to normally hold the inner run of band 36 in the position shown in solid lines in Figure 9, with the result that when a cap passes opposite one of the rolls 80, it will of course move the roll somewhat to the left of the position shown in Figure 9.

The upper portion of the belt or band 36 moves about a grooved idler roller 90 (Figures 10 and 11) journalled on a stud 91 secured to the casing of the selector or guiding mechanism 40, roller 90, like roller 73, being of a height substantially corresponding to the diameter of the cap, with the groove which receives the belt or band 36 intermediate of its height. An idler roller 92 is positioned opposite grooved roller 90, this arrangement insuring that a cap will be firmly held in a vertical plane just prior to the moment it leaves the conveyor 35.

As best indicated in Figures 10 and 11, the article contacting or counting wheel 37 lies in a vertical plane substantially midway between the peripheries of the upper conveyor rolls 90 and 92. Wheel 37 is fixed to a shaft 95 rotatable in a tubular housing 96 extending from and fixed to the casing of counting mechanism 38 and, as shown in Figure 16, the wheel 37 is provided with a number of pockets 97 in its periphery, each of such shape as to closely engage the periphery of a cap moved beneath the same. Thus, each cap moved beneath the wheel 37 by the belt or band 36 and the rolls 90 and 92 will cause the wheel 37 to rotate a predetermined distance. A collar 98 (Figure 11) is keyed to shaft 95 beyond the end of the tubular housing 96, collar 98 being provided on its outer surface with a plurality of sockets 99 aligned with the pockets 97 of counter wheel 37, these sockets being adapted to be engaged by a spring pressed ball 100 mounted in a bracket 101 fixed to the end of housing 96. The purpose of this arrangement is to prevent any over-travel of the counting wheel 37.

A substantially flat spring 102 (Figure 10) positioned opposite belt 36 bears upon each cap as the latter moves beneath the counting wheel 37 to further insure that the caps are held firmly in a vertical position at such time.

The counting mechanism

Referring to Figures 10 to 15, the counting wheel shaft 95 extends into the housing 105 of the counting mechanism 38 and has a pinion 106 fixed adjacent its inner end to drive a reducing gear train generally indicated by the numeral 107. Through this train of gearing, rotation is imparted to a shaft 108 centrally located within the housing 105.

The cam structure 39 is adapted to be rotated with the shaft 108 through a clutch element generally indicated at 109 in Figure 12 and comprising the following structure: Shaft 108 is of reduced diameter at its outer portion as indicated at 110 and an inclined shoulder 111 is thus provided on the shaft. A collar 112 surrounds the reduced portion of shaft 108, the inner end of collar 112 being inclined to seat upon the inclined surface 111. At its outer end, collar 112 is pinned to a sleeve 113 by a pin 114 which extends through the innermost cam of cam structure 39 and into a socket in the inner end of sleeve 113. The outermost portion of the reduced end 110 of shaft 108 is threaded as indicated at 116 to receive a collar 117 adapted to be retained upon the threads 116 by a set screw and disc designated by the numeral 118. The group of discs forming cam structure 39 are secured together in relatively adjusted position by screws 119 threaded in the innermost disc and extending through arcuate slots in the remaining discs so that the discs will rotate together and with the collar 112 and sleeve 113. By the above construction, the discs will be rotated with shaft 108 when sleeve 113 and collar 112 are forced inwardly by rotation of collar 117 to bring the inner end of collar 112 into frictional contact with the inclined shoulder 111 of shaft 108. In order to free the cam discs from driving relationship with shaft 108, it is only necessary to slightly unthread the collar 117 so that the collar 112 will be loose from frictional engagement with the shoulder. When this has been done, the counting mechanism may be set to zero position as hereinafter described.

The cam structure 39, rotated by movement of caps or other articles beneath the counting wheel 37, serves as a master control to count the caps or other articles, and to thereby determine when the flow of articles to one shipping receptacle shall be discontinued and the articles flowed to another receptacle. Cam structure 39 also serves to control the periodic shaking of the receptacles so that articles will be settled in the same.

Referring to Figures 10 to 15, in the present embodiment of the invention, the cam structure 39 comprises three circular discs 120, 130 and 140, formed of non-conducting material and preferably successively of slightly smaller diameter, the largest disc 120 being the innermost disc, and being pinned between the collar 112 and sleeve 113 as described above. The three discs rotate in a counter-clockwise direction, as indicated by the arrow in Figure 15. The periphery of disc 120 is of circular form except for the provision of one depression or irregularity 121. The depression 121 is fairly shallow and, at its leading end, includes a step or shoulder 122. The bottom wall 123 of the depression is flat from the lower end of wall 122 and its opposite end smoothly merges with the periphery of the disc. Near the trailing end of the lower wall 123 a small notch 124 is provided for a purpose hereinafter set forth.

Cam disc 120 is adapted to control a circuit making device including an outer spring contact 125 and an inner spring contact 126, both of which are secured to and insulated from the casing 105 and also insulated from each other. The inner contact 126 includes a cam following finger 127 pivotally attached to its free end and may therefore be regarded as a cam follower. The manner of attaching finger 127 to contact 126, and the range of movement of the finger with respect to the contact is shown in Figure 15c. The outer spring contact 125 is connected by a bolt 128 with a rigid cam follower bar 129 also adapted to bear upon the periphery of cam 120, bar 129 being suitably pivoted as indicated at 129a to a bracket 129b secured to and insulated from the casing 105. As best shown in Figure 10, the inner contact and cam follower 126 is of less width than contact 125 and bar 129 so that bolt 128 may connect the latter two elements.

When the smooth or circular portion of the cam disc 120 is moving in a counter-clockwise direction beneath the finger 127 of inner contact 126 and beneath the cam follower 129 connected to outer contact 125, the two contacts will be separated due to the fact that the outer contact 125 will be raised to the position indicated in dotted lines in Figure 15. With the two contacts in this position, when the depression 121 moves beneath the cam follower bar 129, the bar will drop into the depression so that the outer contact 125 will be moved to the solid line position at Figure 15 with the result that the two contacts will be brought together as indicated in that figure, thereby closing the circuit controlled by the contacts. As diagrammatically illustrated in Figure 2, the contacts 125 and 126 control flow of current through a lead 150 to an electromagnet 151, the other side of the electromagnet being connected to a lead 152. Electromagnet 151, as hereinafter described, forms part of the selector or article guiding mechanism 40, by means of which the flow of caps or articles to one receptacle may be stopped and flow to a second receptacle initiated.

The contacts 125 and 126 will remain in circuit closing position until the cam depression 121 has moved beneath the cam following finger 127 of inner contact 126. At this moment, the finger 127 will drop down into the leading end of the depression so that contact 126 will drop away from contact 125. Almost immediately thereafter, the trailing end of the depression 121 will come opposite the end of bar 129 and the latter will be raised to move the outer contact 125 to the dotted line position of Figure 15. Subsequently, the periphery of cam 120 will move beneath finger 127 so that the latter will be raised to its normal position indicated in Figure 15, at which time it will of course still be separated from outer contact 125, due to the fact that the latter is in the extreme raised position shown in dotted lines.

The cam mechanism 39 of the invention is preferably so designed that the number of caps or other articles moving past the counting wheel 37 during one complete revolution of the cam disc 120 will be the number of caps which will fill a shipping receptacle of the minimum size customarily used for packing caps. For example, if the mechanism is to be used for handling crown caps, the mechanism will ordinarily be so designed that fifty gross caps will move past the counting wheel 37 during one revolution of the cam disc 120, because it is customary in the manufacture of crown caps to use a fifty gross receptacle as the smallest shipping receptacle or packing box. Hence, when the cam disc 120 has made one complete revolution, fifty gross of caps will have been delivered to one shipping receptacle and the contacts 125 and 126 will then engage to close the circuit and energize the electromagnet 151 of article guiding mechanism 40 so that the flow of caps will be diverted from one of the delivery spouts (44 and 45) to the other spout. Thus, no more caps will flow to the shipping receptacle beneath the first spout and the flow of caps to the shipping receptacle beneath the other spout will begin.

It will be also understood from the above that the cam disc 120 thus measures the number of caps or other articles delivered to a receptacle.

In order to adjust the mechanism for operation with shipping receptacles of larger than the minimum size customarily used in the trade, a sequence of hold-out mechanism generally indicated by the numeral 153 is associated with the cam disc 120. Referring to Figures 10, 11 and 15, the hold-out device comprises a wheel 154 which, as best shown in Figure 11, is slidably mounted on a fixed stud 155, the inner end of stud 155 being secured on a depending bracket 156 supported within the housing 105. Wheel 154 has a hub 157 extending inwardly therefrom, the hub being provided with spaced flanges 158 which have an arm of a crank 159 extending between the same. Crank 159 is carried by a shaft 160 which extends outwardly through the casing 105 and has an operating knob 161 fixed to its outer end. By this arrangement, manual rotary movement of operating knob 161 will adjust the position of wheel 154 longitudinally of stud 155, thereby varying the space between wheel 154 and cam disc 120. Wheel 154 is provided with gear teeth about its periphery to engage gear teeth 162 on the collar 112 associated with the cam structure 39. The teeth 162 extend a sufficient distance along collar 112 to insure that the wheel 154 and the collar will always be in mesh, regardless of the movement of the wheel along the collar.

Wheel 154 is provided with a plurality of pins projecting from one side thereof toward the cam disc 120, one of these pins being designated by the numeral 164 and being of substantial length. Diametrically opposite the pin 164, a second pin 165 of similar length also extends toward the cam disc 120. As best shown in Figure 15, a third pin 166 is positioned at a point which is circumferentially equi-distantly spaced between the pins 164 and 165 and, as shown in Figure 11, the third trip pin 166 is approximately only half as long as the trip pins 164 and 165. No pin is provided at the point diametrically opposite short pin 166, as indicated in Figure 15.

*Operation of counting mechanism*

Assuming that the mechanism is to be used for counting crown caps, when the counting mechanism is to deliver caps to receptacles of a fifty gross capacity, the hold-out mechanism 153 would be set by rotating the operating knob 161 to bring an indicator 161a associated therewith to the fifty gross indication on a dial 161b, thereby turning the crank 159 to the position A, indicated by dotted lines in Figure 11. Movement of crank 159 to such position will slide hold-out wheel 154 to the position indicated at A'. In this position of wheel 154, all of its pins 164, 165 and 166 will be entirely out of the plane of cam follower 129. Hence, the contacts 125 and 126 will be operated entirely by cam 120 and may come into engagement with each other after each complete revolution of the disc 120.

As may be understood from the above, the purpose of the hold-out mechanism is to prevent the contacts 125 and 126 from coming into engagement with each other after a complete rotation of the cam disc 120 and since, when the wheel 154 of hold-out mechanism 153 is in position A' of Figure 11, none of the three pins of the wheel is adjacent the contacts 125 and 126, the closing of these contacts will not be prevented.

When the machine is to be used for delivering caps, to a shipping receptacle of a capacity of one hundred gross, that is, double the normal minimum, the operating knob 161 must be turned to the one hundred gross reading on dial 161b, this turning of the knob causing crank 159 to move to dotted line position B of Figure 11, thereby sliding wheel 154 to the position indicated at B'. At such position, the longer trip pins 164 and 165 will extent beneath the cam following bar 129 of the circuit controlling mechanism.

After setting the sequence or hold-out mechanism 153 as described above, it is also necessary to manually operate the mechanism so that at the beginning of a one hundred gross run, either short pin 166 or the blank or pinless portion of hold-out wheel 154 will be opposite bar 129, and in order that the cam disc 120 will make two complete rotations before closing the circuit through contacts 125 and 126. This resetting is accomplished by turning the indicator 113a associated with cam disc collar 113 backwardly to a zero position indicated on a dial 113b (Figure 12) on the housing 105. As has been described above, the collar 113 and the cam disc structure 39 associated therewith may be turned free of shaft 108 by loosening the holding nut 117 to release the collar 112 from clutching engagement with shaft 108.

With the clutch connection 109 thus released, clockwise rotation of cam disc 120 through the operating knob 113 will cause the disc to turn until the abutment 122 at the normally leading end of depression 121 comes into contact with bar 129. However, it is to be noted that shoulder 122 cannot come into contact with bar 129 until bar 129 is in the lowermost position illustrated in Figure 15. In other words, during a resetting operation preceding a one hundred gross run, if one of the long pins 164 and 165 carried by the wheel 153 happens to move beneath bar 129, bar 129 will not contact with the shoulder 122 to stop such rotation of cam 120, and hence the operator can continue rotating the cam disc 120 and, through the same, the hold-out wheel 154, until the two have reached the relative position shown in Figure 15, with the blank or pinless portion of wheel 154 uppermost, or such relative position that hold-out wheel 153 has its short pin 166 uppermost. In either such position, the bar 129 will drop into contact with the shoulder 122 of cam disc 120 and stop further re-setting rotation. The nut 117 may then be tightened to cause the collar 112 and cam structure 39 to be in clutching engagement with shaft 108 and operation of the apparatus can be resumed.

When caps or other articles now move beneath the counting wheel 37, the cam 120 will be rotated in a counter-clockwise direction, and during the time that the bar 129 and finger 127 rest upon the periphery of the cam, their contacts will be out of engagement. Assuming that the counting starts with the cam discs 139 and hold-out wheel 154 in the relative position shown in Figure 15, that is, with the pinless portion of wheel 153 beneath or opposite bar 129, the hold-out wheel 154 is so geared with respect to the collar 112 of disc 120 that at the time that the depression 121 of cam disc 120 comes beneath the bar 129, the pin 165 of wheel 154 (moving in a clockwise direction) also will be directly beneath the bar, thereby holding the bar raised so that the contact 125 will be maintained in the dotted line position shown in Figure 15. Hence, the two contacts 125 and 126 will not come into engagement with each other after this single revolution of the cam disc 120, and during which revolution fifty gross caps will have been delivered to a container beneath one of the spouts 44 and 45. The cam disc 120 will therefore continue and, with fifty gross additional caps passing counting wheel 37, will make a second revolution. At the completion of this revolution the portion of wheel 154 bearing short pin 166 will be beneath bar 129, and since the pin 166 is too short to project beneath bar 129, the latter will drop into the depression 121, so as to bring its contact 125 into engagement with contact 126 as shown in Figure 15. The engagement of the contacts will energize electromagnet 151 of the selector or article guiding mechanism 40 so that the flow of caps will be diverted from the spout to which they have been flowing, and will flow through the other spout to the receptacle beneath the same.

When it is desired to set the machine to deliver caps to an even larger packing receptacle, for example, two hundred gross, knob 161 is turned to position pointer 161a at the two hundred gross mark, thereby moving crank 159 to the solid line position of Figure 11. This action will slide hold-out wheel 154 to its solid line position of Figure 11. After this adjustment, cam disc 120 must be unclutched from shaft 108 and re-set by rotation. It will be noted that in re-setting for a two hundred gross run, the necessary clockwise re-setting rotation of cam disc 120 will only be stopped when the cam disk 120 and the hold-out wheel 153 are in the relative position shown in Figure 15, because that is the only position in which wheel 154 (with all of its pins in the plane of bar 129) will permit bar 129 to stop re-setting clockwise rotation of cam 120 in a clockwise direction as described above. Hence, when the clutch 109 is re-engaged, and with the counting revolution of the cam disc 120 starting with the depression 121 beneath bar 129 as shown in Figure 15, the cam disc 120 will make four complete revolutions without the contacts 125 and 126 coming into engagement. More specifically, at the end of the first revolution the long trip pin 165 of wheel 154 will be uppermost and in contact with bar 129, thereby holding the latter up and out of depression 121 when the latter moves below the bar. At the end of the second revolution, the short pin 166 will hold the bar 129 raised, and at the end of the third revolution the second long pin 164 will be uppermost to hold the bar 129 raised. At the end of the fourth revolution, the wheel 154 will again be in the position shown in Figure 15, so that no trip pin will be beneath the bar to hold the latter raised. As a result, the bar will drop into the depression 121 when the latter moves beneath the same, and electromagnet 151 will be energized to divert the flow of caps from one spout to the other.

It will be noted from the description of the re-setting operations which have been set forth above that the structures of the cam disk 120 and the hold-out mechanism 153, respectively, are such that prior to runs of any length, namely, either fifty gross, one hundred gross, or two hundred gross, the re-setting for these runs will automatically be stopped by the cam follower bar 129 at such point that the ensuing run will be of the proper quantity of articles, even though, in every re-setting, the relative positions of the two elements may not be the same.

The cams 130 and 140 (Figure 15) control the actuation of the oscillatory platforms 46 upon which the shipping receptacles are supported, the cams performing this action by directly controlling the engagement of two spring cam followers 131 and 141, which respectively carry electrical contacts 131a and 141a. Both followers are secured, by an insulating mounting, to the housing 105, and both followers have cam engaging fingers of the type shown in Figure 15c pivotally mounted at their free ends. The finger 132 of follower 131 bears upon the periphery of cam 130 and the finger 142 of contact 141 bears upon the periphery of cam 140. It will be noted that in the present embodiment, the cam 140 is of slightly smaller diameter than cam 130 so that the contact 141a of follower 141 is positioned closer to the axis of the cams than is contact 131. As shown in Figure 11, follower 131 is sufficiently broad to overlap follower 141 so that the two may have their contacts in alignment.

Cam 130 is provided with a plurality of depressions 133, each having a sharp drop or shoulder 134 at its leading end. Cam disc 140 has a like number of depressions 143 spaced thereabout, each depression including a drop or shoulder 144 at its leading end. It will be noted that the depressions 143 of cam disc 140 are positioned behind or in trailing relation to the depressions 133 of cam disc 130.

In the operation of cam discs 130 and 140 and the followers 131 and 141 controlled thereby, the two cam discs will of course rotate with cam disc 120. During the greater part of the rotation of cams 130 and 140, the fingers 132 and 142 of the followers will bear upon the circular periphery of their respective cams as shown in Figure 15a, and during such time, the contacts 131a and 141a will be held out of engagement. However, when the depressions 133 and 143 come adjacent the two contact fingers, the depression 133 of cam 130 controlling finger 132 will move beneath that finger just prior to the time that depression 143 moves beneath finger 142 as shown in Figure 15b. As a result, contact 131a will move into engagement with contact 141a and will remain in such position until the leading and sharply dropped end of depression 143 comes beneath finger 142. During the time that the two contacts are thus in engagement, they will close the circuit diagrammatically shown in Figure 2 and which extends through a rotary contact 148 in article delivery mechanism 40 to one or the other of the shaking mechanisms 46 so that the one of the shaking mechanisms which is at that moment in circuit with the contacts 131 and 141 through contact 148 will be actuated to shake the receptacle supported by the same. This receptacle will be the one to which caps are being delivered through one of the spouts 44 and 45, and the caps in the receptacle will thus be settled to properly packed condition.

It will be noted from Figure 15 that contacts 131a and 141a are out of engagement when the cam disc 120 is in the zero position of that figure. These two contacts will remain out of engagement for a substantial rotation of the cam discs 130 and 140 and will then be successively brought into contact several times during the remainder of the time that the cams are making a single revolution. Thus the packing receptacle will be shaken a number of times during each rotation of the cam structure 39. Because of the fact that the cam discs 130 and 140 are adjustably secured together by the screws 119 extending through arcuate slots therein, the position of the two cams with respect to each other may be varied to either lengthen or shorten the period of shaking action.

During the reverse or clockwise rotation of the cam structure 39 to reset cam 120 to a zero position as has been heretofore discussed, the fingers 132 and 142 will be struck by the drops or shoulders 134 and 144, respectively, of the corresponding cam discs. Because of the pivotal mounting of the fingers upon their contacts, the fingers may move to the positions shown in Figure 15 when this occurs. In order to restore the fingers to their normal positions shown in Figure 15a, the surfaces of the depressions 133 and 143 are provided near their normally trailing ends with notches 135 and 145. When resetting has been completed and the cam structure is again normally operating and therefore rotating in a counter-clockwise direction, the fingers 132 and 142 may swing to normal position by the drag imposed thereon by the cam discs, but if such drag does not restore them to normal position, the contact of a cam finger in the dotted line position of Figure 15 with one of the notches 135 or 145 will cause the finger to be swung to a normal position. The finger 127 of contact 126 controlled by cam 120 may also be swung by the shoulder 122 of depression 121, and will be restored to normal position by notch 124 in the same manner as described above.

*The article guiding mechanism*

Immediately after passing beneath the counting wheel 37, the caps move between the two vertically extending blades 170 of guide element 41, this element directing the stream of caps to either the spout 44 or the spout 45. As best shown in Figures 10 and 16, one of the blades includes a horizontal plate 171 at its upper edge to insure that the caps will not be thrown upwardly. The plates 170 are fixed on vertically extending shafts 172 journaled in the upper portion of the casing 173 of the article guiding mechanism. The lower end of each shaft 172 has a crank finger 174 secured thereto as shown in Figures 16 and 17, which finger has a substantially ball shaped end projecting into a sinusoidal groove 175 cut in the periphery of a cam 176. The two cams 176 are fixed to a horizontal shaft 177 journaled in the side walls of the casing 173. Step-by-step rotation of the shaft 177 by the mechanism hereinafter described causes the cranks 174 to be swung laterally to swing the guide plates 170 to change the feed of caps from one of the spouts 44 or 45 to the other.

The electromagnet 151 has its armature 180 connected by a link 181 to an arm 182 pivoted intermediate its ends upon the shaft 177. At its opposite end, arm 182 carries a pawl 183 controlled by a leaf spring 184. A coil spring 185 serves to normally hold the armature 180 in its outer or right-hand position, one end of the spring being secured to the casing 173 and the other end being connected to the outer end of the armature 180. The pawl 183 engages a ratchet wheel 186 fixed to the shaft 177. By this arrangement, when the electromagnet 151 is energized due to the engagement of contacts 125 and 126 of the registering mechanism as shown in Figure 15, the pawl carrying arm 182 will be swung in a counterclockwise direction and the pawl 183 will rotate the ratchet wheel 186 and also the shaft 177, the degree of rotation imparted to the shaft being only sufficient to bring the next curve or phase of the grooves 175 of cams 176 into engagement with the arms 174 so that the guide plates 170 will be swung from one extreme position to the other.

As has been explained above, the electromagnet 151 is only energized when a number of caps or other articles corresponding to the capacity of a packing receptacle has passed beneath the counting wheel 37. The energization of electromagnet 151 is only momentary and as soon as it is deenergized the spring 185 will draw the armature 180 outwardly or to the right so that the pawl 183 will ride over the ratchet wheel 186 in a clockwise direction. As shown in Figure 13, in order to prevent over-travel of the shaft 177, a notched wheel 190 is fixed to the shaft 177, the notches 191 of the wheel being adapted to be engaged by a spring pressed ball 192 carried in an overhanging portion of the casing 173. The notches 191 are so spaced that the shaft 177 will be stopped at proper points in its rotation. To further insure that the shaft 177 will not over-travel, a stop pawl 194 is pivoted to the selector housing as indicated at 195, this pawl being adapted to engage a second ratchet wheel 196 facing in the opposite direction from the actuating pawl 183. The stop pawl 194 is positioned in the path of movement of the armature link 181 so that it will be held out of engagement with the ratchet wheel 196 as shown in Figure 18 during the time that the armature is in its normal outward position. When the armature 180 is drawn into the solenoid to thereby move the link 181 to the left, pawl 194 will be swung inwardly due to pressure exerted thereon by a flat spring 198 and will engage a tooth of the ratchet wheel 196.

In order to accurately limit the outward movement exerted upon the armature 180 by the coil spring 185, a set screw 200 is mounted in the casing 173 with its inner end opposite the path of movement of the pawl carrying arm 182.

The shaft 177 also carries the rotary contact device 148 by means of which the shaker operating circuit primarily controlled by the contacts 131 and 141 of the counting mechanism is finally controlled so that the packing receptacle supporting platform which carries the container to which caps are being directed will be the only one of the two platforms to be vibrated. As best indicated in Figures 14 and 17 and diagrammatically shown at Figure 2, a sleeve 205 of insulating material is secured to shaft 177 and a metal sleeve 206 surrounds or overlies sleeve 205, sleeve 206 having portions thereof cut away as indicated at 207, these cut away portions being of such shape that while one fixed contact 208 will always be in engagement with metal sleeve 206, it will be impossible for two other fixed contacts 208a and 208b to both be in contact with metal sleeve 206 at the same moment. That is, when one of the two contacts 208a and 208b is bearing on metal sleeve 206, the other of these two contacts will be opposite a cut-out portion of that sleeve and hence will be bearing on insulating sleeve 205. In this way, sleeve 206 will bridge fixed contacts 208 and 208a and will alternately bridge fixed contacts 208 and 208b.

As diagrammatically shown in Figure 2, the contact 208 is connected to the contact 141 of the counting mechanism by a lead 210 and since contact 131 of the counting mechanism is connected to one side of a source lead 150, the momentary engagements of contacts 141 and 141 will place contact 208 in direct circuit with the source of current. The contact 208a is connected by a lead 213 with the solenoid 214 of the shaking mechanism 48. At the time that the cap guiding element 41 is in position to direct caps to a receptacle on the platform corresponding to the shaking cylinder 48, contact 208a will be in engagement with metal contact sleeve 206. Since contact 208 is always bearing on the sleeve, the circuit from the lead 150 will then be completed through sleeve 206, contact 208a, lead 213, solenoid 214 and lead 215 to the other source lead 152. As a result, when the contacts 131 and 141 become engaged by rotation of the cams 130 and 140, solenoid 214 will be energized to actuate the shaking cylinder 48.

Contact 208b communicates through a lead 218 with one side of the solenoid 215, which controls shaking cylinder 48a. When the cap guiding element 41 is positioned to direct caps to the packing receptacle corresponding to shaking cylinder 48a, a portion of sleeve 206 will be opposite the contact 208b and since contact 208 is also in contact with sleeve 206, when the contacts 131 and 141 are moved into engagement by rotation of cams 130 and 140, the solenoid 215 which actuates cylinder 48a will be energized.

*The shaking mechanism*

The solenoids 214 and 215 are of identical construction, each solenoid generally comprising, as illustrated in Figure 22, a coil 220 and an armature 221, the armature being provided at its lower end with a needle valve 223 adapted to seat in the upper end of a valve passage 224 opening to an outlet port 225. The upper end of passage 224 opens to a chamber 226 having an inlet port 227 in communication therewith. When coil 220 is deenergized, the needle valve 223 will seat in the port 224 by its own weight, thereby cutting off communication between the inlet port 227, which communicates through a line 228 with a source of compressed air, and the outlet port 225, which, in the case of solenoid 214, communicates with the shaking cylinder 48 by a line 228a. The outlet port 225 of solenoid 215 communicates with the shaking cylinder 48a through a line 228b.

The shaking cylinders 48 and 48a are of identical construction, each cylinder including a piston chamber 230 which is pivotally supported as indicated at 231 by trunnions 232. A piston 47 is mounted for reciprocation in the chamber 230, the piston 47 being fixed to a piston rod 234 which has its lower portion extending down through a packed bore in the lower wall of the piston chamber to be pivotally connected as indicated at 235 to one end of the corresponding shaking platform 46. The upper portion of the piston rod 234 extends through a packed bore in the upper end wall of piston chamber 230, the guided mounting of piston rod 234 in both the upper and lower end walls of the piston chamber insuring that the piston rod will move rectilinearly with respect to the chamber.

The reciprocation of piston 233 within the piston chamber 230 to effect oscillation of the corresponding platform 46 is effected by actuation of a slide valve 237 moving in a valve chamber 239 which extends longitudinally of the cylinder 48 and communicates with the upper end of the piston chamber through a port 239 and with the lower end of the piston chamber through a port 240. The air inlet line 228a communicates with valve chamber 238 intermediate the ends of the latter.

Valve 237 has a groove 241 extending longitudinally of the same, which groove is always in communication with the inlet pipe 228. Adjacent its upper end, valve 237 is reduced to form a transverse groove 242 and a similar groove 243 is provided adjacent its lower end. The upper end of valve 237 is cut away as indicated at 244, this cut-away portion 244 being constantly open to the atmosphere and being intermittently positioned opposite the upper piston chamber port 239. Just below the lower valve groove, 243, another groove 245 is provided in the valve 237, this groove being long enough to extend out of the valve chamber 238 and thereby adapted to intermittently place the piston chamber port 240 in communication with the atmosphere.

Valve 237 includes at its lower end an extension or rod 237a which projects entirely out of the valve chamber and carries a friction device 246 which moves between plates 247 depending from the cylinder structure.

The friction device 246 comprises two friction shoes 248 held in a bracket 249 fixed to the sides of valve rod 237a by welding as shown at 249a in Figure 21. A spring 250 extends through apertures 251 in the brackets and valve rod to force the friction shoes apart and to maintain them in close contact with the plates 247. This arrangement insures that the valve will remain in the vertical position to which it is moved by the receptacle or container supporting platform 46, as hereafter described, and against both the action of gravity and the pressure of the fluid moving through the valve.

The lower end of bracket 249 includes lateral flanges 252 and the extreme lower end of valve rod 237a is provided with laterally extending flanges 253 positioned in the path of movement of arms 254 on the near end of the corresponding shaking platform 46.

The operation of either cylinder 48 or 48a is as follows:

When the valve 237 is in the lowered position shown in Figure 20, compressed air will enter through line 228a and flow downwardly through grooves 241 and 243 to enter the piston chamber port 240, thereby forcing the piston 47 upwardly to swing the near end of the corresponding shaking platform upwardly. During such movement of the piston, the upper piston chamber port 239 is in communication with the atmosphere through valve port 244, the upper transverse groove 242 of valve 237 being below and out of communication with upper piston port 239. When the near end of the platform 46 swings upwardly, the upper surface of the arms 254 will strike against the lower surfaces of the flanges 252 on bracket 249, thereby moving the valve rod and valve upwardly so that the upper transverse groove 242 of the valve will be opposite the upper piston chamber port 239 while the groove 245 of valve 237 will move opposite the lower piston chamber port 240 to place the latter in communication with the atmosphere. As a result, compressed air will enter the upper portion of the piston chamber to drive the piston downwardly and when the arms 254 of platform 46 strike the flanges 252 at the lower end of the bracket 249, the valve will be returned to the position of Figure 20.

The pivotal mounting of the cylinders 48 and 48a on their trunnions 232 will permit the pistons to swing somewhat with the movement of the platform. The air inlet connections 228a and 228b are either flexible hose or include a joint adjacent the cylinders 48 and 48a to permit swinging of the cylinders.

The platforms 46 are both of identical construction, each platform being pivotally supported by pins 260a extending into trunnions 260 and the platforms being positioned alongside each other as shown in Figure 1 so that one platform will be beneath the spout 44 and the other beneath the spout 45. The pivot pins 260a are fixed to their platforms in such position that each platform is slightly off-balance, thereby insuring that at the conclusion of any shaking movement of a platform, the latter will always move to an inclined position and hence its valve 237 will be in either extreme upward or downward position. This arrangement will of course prevent a valve 237 from stopping in such position as to close both of the ports 239 and 240.

In order that packing receptacles of various sizes will be securely centered and retained on the platforms during their oscillation or shaking, each platform includes a base plate 261 having bars 262 welded to its upper surface adjacent the side edges thereof and, at its inner end, a cross bar 263 of the same height as the bars 262. As indicated in Figures 19 and 20, plates 262a and 263a overlie the bars 262 and 263 to build up a substantially high edge or wall about the edges of the plate 261. Within each corner of the framing edge thus formed is positioned a right angled bracket 264, brackets 264 being of less height than the framing edge.

As shown in the right-hand portion of Figure 1, the above arrangement enables various sizes of boxes to be securely held on the oscillatory platforms. For example, a box of relatively small capacity and of substantially square outline such as indicated at R′ may be positioned between the side elements 262 of the framing edge, with its front and rear corners in contact with the faces 264a of the right angled members 264. Also, a box of substantially similar capacity but of oblong outline may be positioned entirely within the right angled members 264, as indicated by the dot and dash lines $R^2$. A box of somewhat larger outline indicated at $R^3$ can be seated upon the right angled members with its side walls in contact with the inner surfaces of the side bars 262 and its inner end in contact with the end bar 263. In order to further hold a box of this size in position, blocks 266 each having a plate 266a welded thereto to make them of the same height as the plates 262a are provided at the forward ends of the side bars. A still larger receptacle, indicated at $R^4$, can be seated on the upper surfaces of the framing walls. In order to hold such a box more secure, right angled elements 268 are provided on the upper surface of the framing wall at the rear corners thereof and strips 269 are provided along the side edges of the framing walls at the front ends thereof.

Rubber blocks 270 may be secured to the floor beneath the ends of the shaking platforms to absorb vibration.

A general description of the operation of the entire apparatus disclosed herein has been set forth in the opening portion of this specification, and the specific operation of each mechanism has been set forth in connection with the description of the construction of each mechanism.

It will be obvious that the entire apparatus may be used for handling various types of articles, and also that the mechanisms and devices disclosed herein need not be used only with each other but may be used for various purposes, either alone, or as portions of other apparatus.

Subject matter disclosed but not claimed herein is claimed in my divisional application for Article shaking mechanism, filed May 8, 1942, Serial No. 442,279.

It will be further understood that the invention is not limited to the details of construction shown in the drawings and that the phraseology employed in the specification is for the purpose of description and not of limitation.

I claim:

1. In combination, an article contacting member, an element to control the path of articles after movement past said member, a rotatable shaft to which said member is secured, a cam driven from said shaft, a gear operatively connected in driving relationship to said shaft, a circuit controlling device engaging said cam for normal operation by the latter, operating means for said element in circuit with said device, and means on said gear to periodically hold said device out of engagement with said cam so that an increased number of articles may move past said member before the position of said element is varied.

2. In combination, an article contacting member, an element to control the path of articles after movement past said member, a rotatable shaft to which said member is secured, a cam driven from said shaft, a sequence member operating in timed relation to said cam, a circuit controlling device engaging said cam for normal operation by the latter, operating means for said path controlling element in circuit with said device, said sequence member having a plurality of pin elements of unequal length thereon adapted to contact with said circuit controlling device to prevent operation of the latter by said cam, the relative timing of said sequence member and said cam being such that an irregularity of said cam and a pin on said member may be in alignment on each cycle of said cam, and means to adjust the position of said sequence member with respect to said circuit controlling device so that the periods at which a cam irregularity and a pin member will coincide may be varied.

3. In combination, an article contacting member, an element to control the path of articles after movement past said member, a rotatable shaft to which said member is secured, a cam driven from said shaft, said cam including an irregularity in its cam surface, a pair of cam followers bearing on said surface, each of said followers carrying a contact, the respective contacts being so arranged that they will be out of engagement with each other when both of said followers are bearing on the normal operating surface of said cam, the irregularity in the operating surface of said cam being of such outline that when one of said followers engages the same, its contact will engage the other contact, operating means for said path controlling element in circuit with said contacts, and means associated with said cam to hold one of said followers out of engagement therewith during a selected number of movements of the cam irregularity beneath said follower.

4. In combination, an article contacting member, an element to control the path of articles after movement past said member, a rotatable shaft to which said member is secured, a cam driven from said shaft, said cam having a depression in its periphery, a pair of cam followers bearing on the periphery of said cam, each of said followers carrying a contact, the contact of one of said followers being spaced further from the axis of said cam than the other contact, the depression in said cam being sufficiently deep to cause said further contact to come into engagement with the other contact when its follower moves into the cam depression, operating means for said path controlling element in circuit with said contacts, and means associated with said cam to hold said furthest follower out of said depression during a selected number of movements of the cam depression beneath said follower.

5. The combination in an article conveyor system, of an article counting means, an article guiding member, and means to actuate said guiding member from said counting means including a circuit controlling device periodically actuated by said counting means, an electro-motive mechanism in circuit with said device, and a rotary cam operatively connected to said article guiding member to control the position of the latter, said electro-motive mechanism having a step-by-step driving connection with said rotary cam to drive the latter.

6. In combination, a rotatably mounted article contacting member, a rotatable cam element adapted to be driven by said member, means to control the path of the articles after they have actuated said article contacting member, a follower for said cam operatively connected to said path controlling means to control the operation of the latter from said cam element, rotary hold-out means mounted on a fixed axis parallel to the axis of said cam element and driven from said article contacting member to hold said cam follower away from said cam element for a selected number of rotations of said cam element, said cam element and said hold-out means being arranged to be re-set to a zero setting before runs of different numbers of articles by reverse rotation of said cam element, said cam follower serving as a zero position stop for such reverse rotation.

7. In combination, an article contacting member, a guide element to control the path of articles after movement past said member, a rotary element operated by said member, contacts operated by said rotary element, an electrically operated prime mover in circuit with said contacts and adapted to vary the position of said guide element when said contacts are operated to engaged position by said member, and rotary means driven by said article contacting member and mounted independently of said rotary element to selectively hold said contacts out of engagement.

8. In combination, an article contacting member, an element to control the path of articles after movement past said member, a rotatable shaft to which said member is secured, a cam driven from said shaft, a circuit controlling device engaging said cam for normal operation by the latter, operating means for said element in circuit with said device, and cam means independent of said first cam and carried by a shaft driven from said first shaft to periodically hold said device out of engagement with said cam so that an increased number of articles may move past said member before the position of said element is varied.

9. In combination, an article contacting member, a guide element to control the path of articles after movement past said member, a rotary element operated by said member, means operated by said rotary element to vary the position of said guide element when a given number of articles have moved past said article contacting member, and a second rotary element rotated by said article contacting member simultaneously with said first rotary element to vary the cycle of operation of said first rotary element so that an increased number of articles may move past said article contacting member before the position of said guide element is varied, said two rotary elements being movable about fixed and respectively parallel axes.

EIBE A. WILCKENS.